P. W. SMITH.
AUTOMOBILE LOCK.
APPLICATION FILED APR. 16, 1914.
1,139,733.
Patented May 18, 1915.
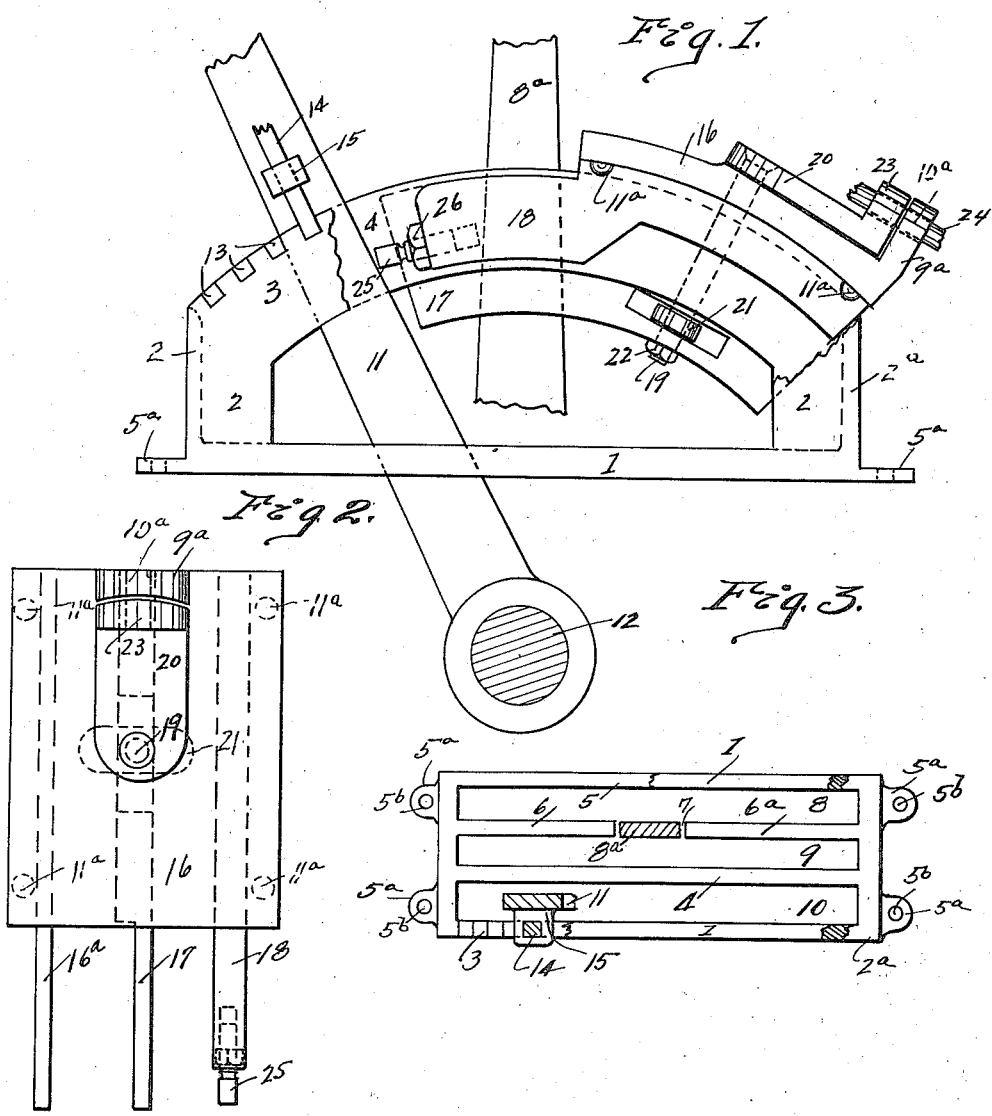

UNITED STATES PATENT OFFICE.

PASCHALL W. SMITH, OF SEATTLE, WASHINGTON.

AUTOMOBILE-LOCK.

1,139,733.  Specification of Letters Patent.  Patented May 18, 1915.

Application filed April 16, 1914. Serial No. 832,182.

*To all whom it may concern:*

Be it known that I, PASCHALL W. SMITH, a citizen of the United States, and a resident of the city of Seattle, in the county of King and State of Washington, have invented certain new and useful Improvements in Automobile-Locks, of which the following is a specification.

This invention relates to automobile locks and has for its principal object to provide a lock adapted to be used in connection with an ordinary H-plate, and which is effective to lock the brake lever as well as the control lever of the automobile against movement.

Other objects will appear as the invention is more fully described and explained in the following specification, illustrated in the accompanying drawings, and pointed out in the appended claims.

In the drawings, Figure 1 is a side elevation, with parts broken away, of a form of H-plate with my device applied thereto. Fig. 2 is a plan view of my device. Fig. 3 is a plan view of Fig. 1, with my device removed.

Referring now more particularly to the drawings, Fig. 1 designates the bottom portion of a form of H-plate, the front and rear ends 2 and $2^a$, respectively, of which extend upwardly as shown in dotted lines in Fig. 1, and from one to the other of the said ends extend the upwardly curved plates 3, 4 and 5, respectively, there being ears $5^a$ having screw-eyes $5^b$ for securing the said H-plate to the floor of the automobile. Between the plates 4 and 5, and extending from the ends 2 and $2^a$, respectively, are shorter plates 6 and $6^a$ the free ends of which are spaced apart leaving a passage 7 which connects the ways 8 and 9 within which moves the lever $8^a$, which controls the meshing of the usual gears of an automobile, no particular description of which is believed to be here necessary to a proper understanding of my invention, as the same is well known in the art. Within the way 10 moves the brake lever 11 about its pivot shaft 12, and the plate 3 has notches along its upper edge with which the dog 14, slidable in bearings 15 upon the lever 11, is adapted to coöperate in order to hold the said lever in its various adjusted positions. The said lever, as seen in Figs. 1 and 3, is in its extreme locked position and would have to be moved toward the right, as viewed in Fig. 1, in order to unlock the usual brakes, and the control lever $8^a$, which, if moved in the direction indicated, would cause the usual meshing of the gears of the automobile, as is well known in the art.

16 indicates a plate which may be of any suitable form, but is preferably of the shape shown, the right-hand end of which as viewed in Fig. 1, is upturned as at $9^a$, and bored through as indicated by the dotted lines $10^a$. At approximately the four corners of the said plate are knobs $11^a$ which form two points of contact on each side of the said plate with the H-plate. I provide the said knobs because the curvature of various makes of H plates differ from each other somewhat and the said knobs make sure points of contact regardless of such variation in curvature, as will be understood. Extending downwardly from the plate 16, as viewed in Fig. 1, are blades $16^a$, 17 and 18 and the said plate and the blade 17 are bored through to revolubly receive a bolt 19, one end of which is secured to a hasp 20 and near its opposite end is secured a bolt 21, the extreme of the bolt 19 having fitted to it a nut 22. The opposite end of the said hasp is upturned as at 23, and bored through as indicated in dotted lines in Figs. 1 and 2.

From the foregoing it is believed that the construction of my device will be clear to others, and its operation is that when the control lever $8^a$ is moved into the space 7 (its "neutral position"), the brake lever 11 moved to its operative position as shown in Fig. 1, the hasp 20 turned about its pivot sufficiently to allow the bolt 21 to pass down through the way 9 so as to permit the knobs 11 to rest upon the H-plate, as plainly shown in Fig. 1, and the hasp 20 then turned to its position as seen in that figure, no movement of either of the said levers can occur because the left-hand end of the blade 18, as viewed in Fig. 1, is directly in the forward path of the brake lever 11, and the blades $16^a$ and 17 lying, as they do, alongside of the extensions 4 and 5, do not leave space within the ways 8 and 9 sufficient to permit the control lever 8 to fully enter either of the said ways, and if a hasp 24 of an ordinary padlock be now thrust through the openings in the upturned portions 23 and $9^a$ both of the said levers are effectually locked against movement. If, due to wear or other reasons, the brake lever 11 assumes a position farther to the left, as seen in Fig. 1, in order to perform its usual braking function, some slight movement of course would then take place between the free end of the blade 18 and the said lever, and to prevent this I provide an adjusting screw 25 which enters the said end of the blade 18, and a jam nut 26, so that, as the wear takes place, the said screw may be advanced and set correspondingly, as will be understood.

While I have shown and described a particular form of embodiment of my invention, I am aware that many minor changes therein will readily suggest themselves to others without departing from the spirit and scope of the invention, and I therefore desire to avoid being limited to the exact form shown and described. It is obvious, for example, that the adjusting screw 25 could be applied to all the blades mentioned.

What I claim as new and desire to protect by Letters Patent is—

1. In a locking device for levers which move in the usual H shaped segment, the combination of a plate and parallel blades thereon, which are in spaced relation to each other and adapted to be thrust through the openings in the segment, the lengths of the said blades corresponding to the approximate forward travel of the lever, means for adjusting the lengths of the blades and means for locking the said plate against vertical movement with respect to the segment, the last mentioned means including a hasp and a bolt which moves with the said hasp and which coöperates with the bottom of the segment.

2. In a locking device for levers which move in the usual H shaped segment, the combination of a plate and parallel blades thereon, which are in spaced relation to each other and adapted to be thrust through the openings in the segment, the lengths of the said blades corresponding to the approximate forward travel of the lever; screw and jam nut means for adjusting the lengths of the blades and means for locking the said plate against vertical movement with respect to the segment, the last mentioned means including a hasp and a bolt which moves with the said hasp and which coöperates with the bottom of the segment.

PASCHALL W. SMITH.

Witnesses:
 FRED P. GORIN,
 R. D. SMALLEY.